Jan. 22, 1929.  A. G. KOEGEL  1,699,666
LACING FOR BALLS
Filed March 16, 1927
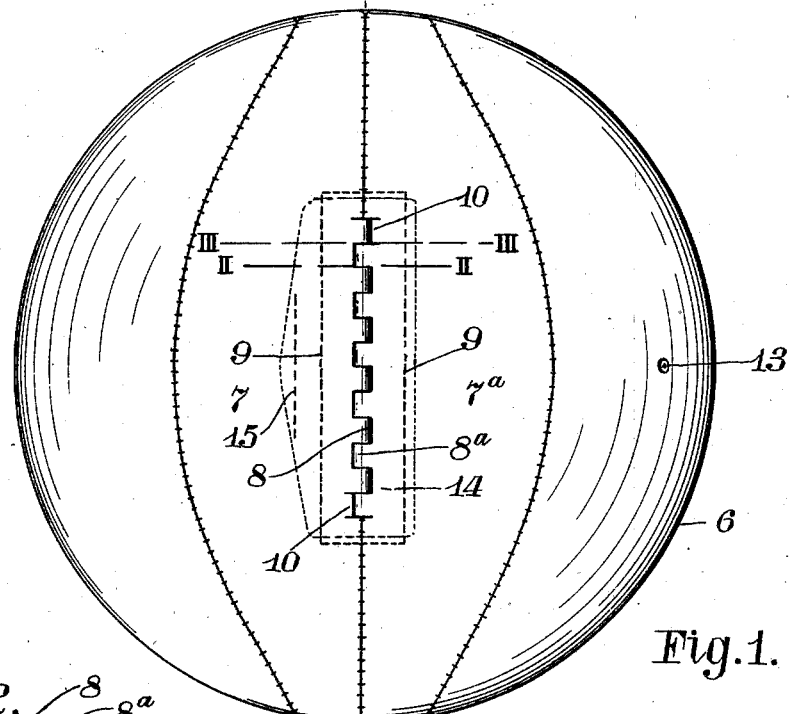
Fig. 1.
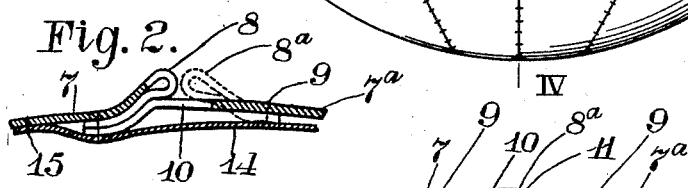
Fig. 2.
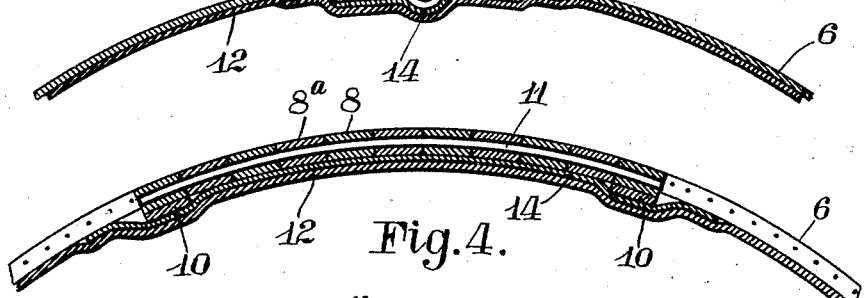
Fig. 3.
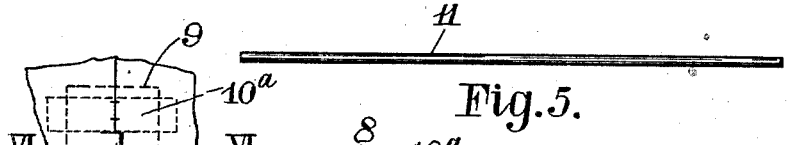
Fig. 4.
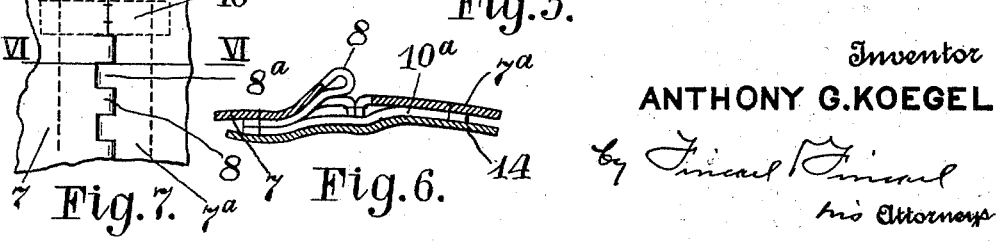
Fig. 5.
Fig. 6.
Fig. 7.
Inventor
ANTHONY G. KOEGEL
by Fincael Fincael
his Attorneys Patented Jan. 22, 1929.

1,699,666

UNITED STATES PATENT OFFICE.

ANTHONY G. KOEGEL, OF CINCINNATI, OHIO.

LACING FOR BALLS.

Application filed March 16, 1927. Serial No. 175,694.

This invention relates more especially to the lacing of an inflatable or stuffed ball such as a basket ball, foot ball and the like. In such a ball it is important to have the lacing of the opening on the inner side of the ball so as not to present an external excrescence thereon because when the ball strikes a surface at such an excrescence it is likely to be deflected out of its expected course. The prior method of lacing such balls involved the use of a special needle and the process was very difficult and time-consuming. For commercial purposes such work is only satisfactorily done by experts. If, in the use of the ball, the inflating bladder springs a leak and needs to be removed for repair or replaced with a new one, it is necessary to cut the lacing and provide a fresh one. This was a troublesome job if attempted by one inexperienced in the work.

The object of the present invention therefore is to make a lacing that will be strong and durable, and that can be easily, quickly and perfectly effected by the unskilled.

The invention is embodied in the example herein shown and described, the features of novelty being finally claimed.

The invention is embodied in the example herein shown and described.

In the accompanying drawing—

Figure 1 is a plan view of a basket ball at the side containing the opening laced according to my invention.

Fig. 2 is a fractional section on the line II—II Fig. 1, but on a larger scale with the loops unlaced.

Fig. 3 is a similar fractional section on the line III—III Fig. 1 with the loops laced and the inflating bladder added.

Fig. 4 is a section on the line IV Fig. 1.

Fig. 5 is a side view of the unflexed loop-connecting or binding member.

Fig. 6 is a sectional view of a modification on the line VI—VI, Fig. 7.

Fig. 7 is a plan view of a fraction showing in broken lines the position of the binder as in the modification Fig. 6.

In the views 6 designates the ball which, as before indicated, usually includes lenticular sections or panels such as at 7 and 7ª sewed together to give the ball its spherical or spheroid form and with as smooth an exterior surface as possible.

The adjacent sections 7 and 7ª where the opening to the ball is to be left are, for the instance shown, primarily cut wide enough to permit the provision on each of spaced tongues of leather to form loops 8 and 8ª arranged to mesh or interjoin alternately and have their openings alined with one another when the opening to the ball is to be closed. As shown the ends of the tongues on each section 7 and 7ª forming the loops are sewed by a line of stitching 9 securing the ends of the loop-forming tongues to the inner side of the ball. In Figs. 1-4 end tongues 10 on each piece 7 and 7ª are also provided these being left unlooped and stretched across the opening and sewed to the opposite section, such tongues 10 constituting a binder to aid in holding the parts of the lacing in line and in preventing the rupturing of the stitching between the sections beyond the lacing opening. But the binder at each end of the opening can be made as a separate short piece 10ª as shown in Fig. 6 stitched at both ends to the panels thereby giving perhaps a better alinement to the ends of the opening.

To close the opening, or effect the "lacing", the loops 8 and 8ª are first brought into line or threaded on a stiff rod somewhat longer than but of substantially the diameter of the flexible member shown at 11 in Fig. 5. The said flexible member 11 which is best of non-resilient or very slightly resilient material as raw hide or "gut" is of a length equal to substantially the sum of the widths of the loops so as to just about fill the loops when the ball is inflated. The flexible member 11 is easily substituted for the stiff member in the loops referred to by closely trailing the stiff member with the flexible member, the end of the latter being kept against the end of the former during the substitution. After the flexible member 11 is inserted and shortly before the ball is completely inflated the connected or laced loops can be shoved down to lie flush with the surface of the adjacent portions of the ball as shown in Figs. 3 and 4, it being observed, as shown in Fig. 4, that, because the member 11 is of raw hide or gut and not substantially resilient, it assumes an arcuate form without exerting substantial strain on the leather of the loops. When the lacing is thus shoved down the member 11 is held from longitudinal or endwise movement by reason of the fact that it lies between the edges of the stitched portions of the sections.

The character 12 designates the usual inflating member or "bladder" so called, having its nipple at 13. Abrasion of the bladder by the lacing is prevented by means of flap 14 sewed to the inner side of section 7 by stitches at 15, said flap being spread out when the bladder is partially inflated and before the lacing is effected.

It is obvious that to gain access to the bladder to repair it it is only necessary to deflate the ball and squeeze the lacing outward to expose the ends of the member 11, after which said member 11 can be shoved out with the aforesaid stiff rod.

The forms of the parts can be changed without departing from the gist of the invention as claimed.

What I claim is:

1. A lacing for the opening of a ball of the class described, including flexible segments forming the opening to the interior of the ball, each of said segments provided with loops wholly integral therewith and interfitting the loops of the other segment, a flexible lacing member for said loops of non-metallic material and of a length substantially equal to the sum of the widths of said interfitting loops, and flexible tongues at the interior of the ball binding the portions of segments together adjacent the terminal loops of said segments.

2. A lacing for the opening of a ball of the class described, including flexible segments forming the opening to the interior of the ball, each of said segments provided with loops wholly integral therewith and interfitting the loops of the other segment, a flexible lacing member for said loops of a length substantially equal to the sum of the widths of said interfitting loops and flexible tongues at the interior of the ball binding the portions of segments together adjacent the terminal loops of said segments.

ANTHONY G. KOEGEL.